United States Patent
Finn

[15] 3,695,309
[45] Oct. 3, 1972

[54] POWER OPERATED WIRE WRAPPING TOOLS

[72] Inventor: Frederick George Finn, Sevenoaks, Kent, England

[73] Assignee: The Post Office, London, England

[22] Filed: Aug. 28, 1970

[21] Appl. No.: 67,948

[30] Foreign Application Priority Data

Sept. 8, 1969  Great Britain........44726/69

[52] U.S. Cl.................................140/124, 242/7.17
[51] Int. Cl.............................................B21f 15/04
[58] Field of Search ....140/119, 124; 242/7.06, 7.17, 242/7.18

[56] References Cited

UNITED STATES PATENTS 2,696,656  12/1954  Madden......................140/124
2,743,502  5/1956  Reck..........................242/7.17
2,732,139  1/1956  Shaff.........................242/7.17
3,219,067  11/1965  Meyer........................242/7.17
3,393,715  7/1968  Finn..........................242/7.17

*Primary Examiner*—Lowell A. Larson
*Attorney*—Hall & Houghton

[57] ABSTRACT

A motor-driven tool for making electrical connections by means of wrapped joints has a wire wrapping and insulation stripper head and a cutter for shearing the wire. The tool is controlled by a trigger which is also connected to the cutter. Operation of the trigger first actuates the cutter and then the motor.

14 Claims, 4 Drawing Figures

POWER OPERATED WIRE WRAPPING TOOLS

This invention relates to power-operated wire wrapping tools, and has particular, but not exclusive reference to power-operated wire wrapping tools used to make electrical connections between terminal tags and wires and between two or more wires.

According to the present invention, there is provided a power-operated device for making electrical connections by means of wrapped joints including a member, a wire wrapping and insulation stripping head operatively connected to the member, a motor arranged to rotate said member, and a wire shearing mechanism comprising two components movable relative to each other to shear the wire, the wire wrapping and insulation stripping head having a longitudinal hole for receiving a component to be wrapped, or each of two components to be joined together by means of a wrapped joint, the arrangement being such that a single movement by an operator actuates the wire shearing mechanism, and subsequently causes the motor to rotate the member.

The motor may be controlled by means operated by a trigger. The motor may be an electric motor, and may be controlled by a switch operated by the trigger. The trigger may be operably connected to the wire shearing mechanism, and may be connected by means of a cable.

Preferably, the axial distance between the wire shearing mechanism and the wire wrapping and insulation stripping head is adjustable. This may be arranged by having the wire wrapping and insulation stripping head secured to a stem itself secured to the member so that the axial distance between the member and the head is adjustable. The stem and the member may be hollow and there may be a stop member securable in a plurality of positions within the bore of the stem and the member.

There may be provided indexing means to bring the wire wrapping and insulation stripping head into substantially the same angular position after each operation. The means may comprise a snail cam operatively connected to the member, and a cam follower resiliently urged against the cam. Preferably, the cam follower is urged against the cam only when the motor is switched off. The drive may be via a speed reduction gear, which may be a worm gear, and there may be provided a clutch between the speed reduction gear and the member. The clutch may provide full movement in one direction, and a limited amount of movement in the other direction. The clutch may be a spring-wrap clutch.

The follower may be lifted clear of the cam by the action of the movement of the trigger before the switch is actuated.

The wire shearing device may comprise two annular portions, both co-axial with the driving member, the first portion being secured to the body of the device and having a longitudinal groove in its outer curved surface and the second portion, being rotatable relative to the first portion by the tension in the wire and having a cropping edge co-operable with the groove in the first portion. Preferably, there is provided a spring to urge the second portion into its initial position when the tension in the cable is removed.

By way of example only, an embodiment of the present invention will now be described with reference to the accompanying drawings of which:

Figure 1:
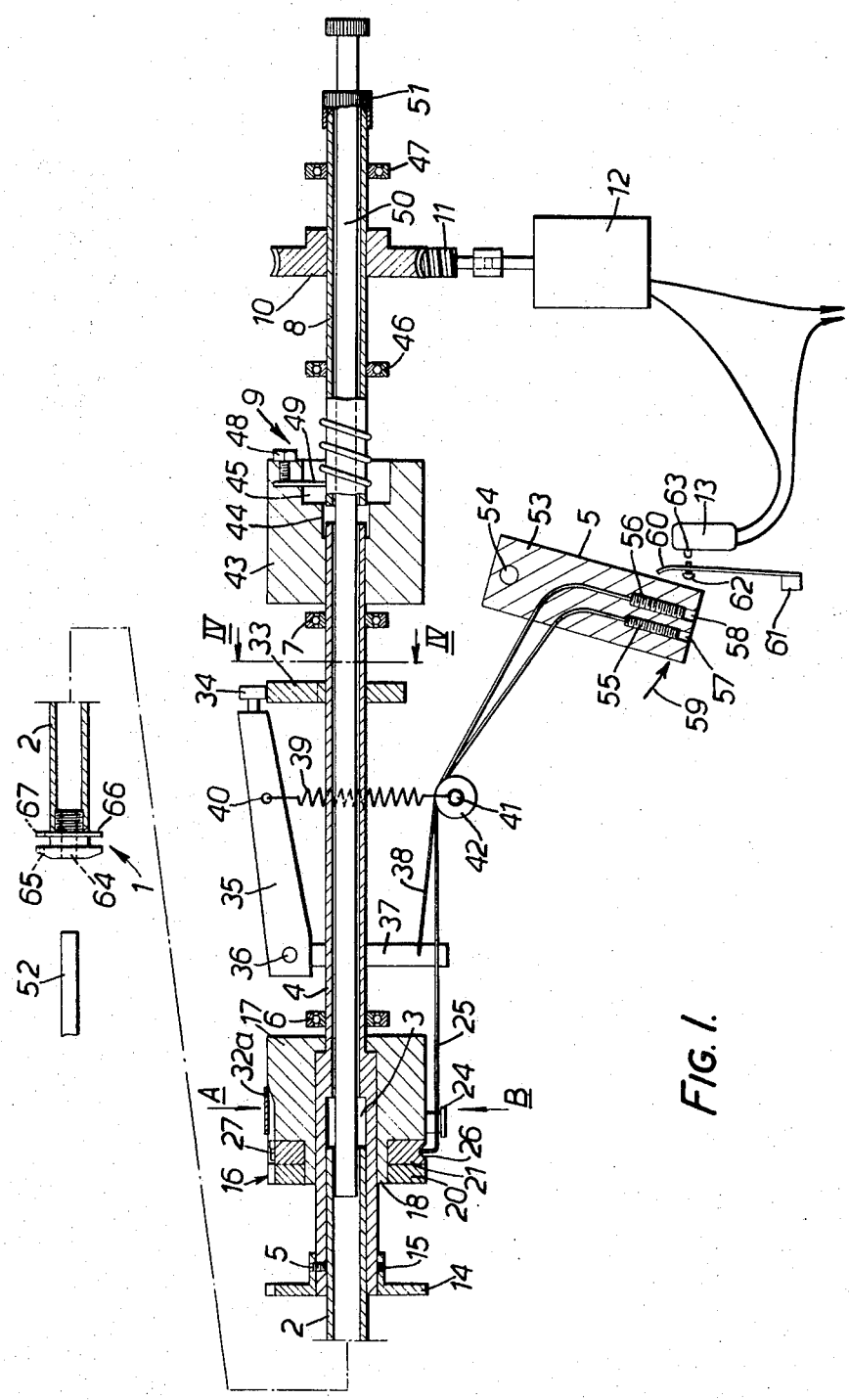
FIG. 1 is a diagrammatic part sectional view of the wire wrapping tool.

The wire wrapping tool comprises a wire wrapping and insulation stripping head 1 which is screwed in to a hollow stem 2. The stem 2 passes into the broader portion of the stepped bore 3 of a driving member 4. The stem 2 is adjustably held in position in the bore 3 by a grub screw 5, and the driving member is located and supported by sets of ball bearings 6 and 7 mounted in the body (not shown) of the tool. The driving member 4 has a rear portion 8 which is separated from the forward part of the member by a clutch indicated generally at 9.

Secured to the portion 8 is a wormwheel 10 rotatable by a worm 11 mounted upon the spindle of an electric motor 12. The electric motor is controlled by a switch 13, and may be protected by a thermal overload cutout (not shown) in the normal way.

Figure 2:
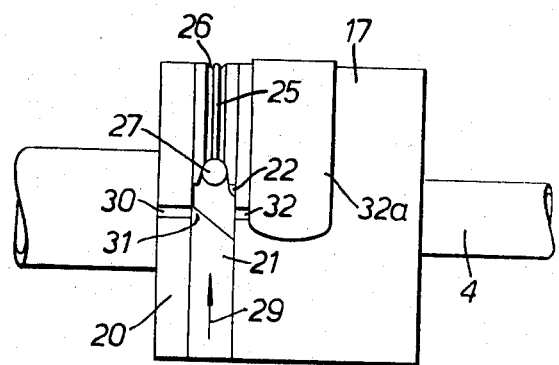
FIG. 2 is a part plan view along the arrow "A" of FIG. 1.
Figure 3:
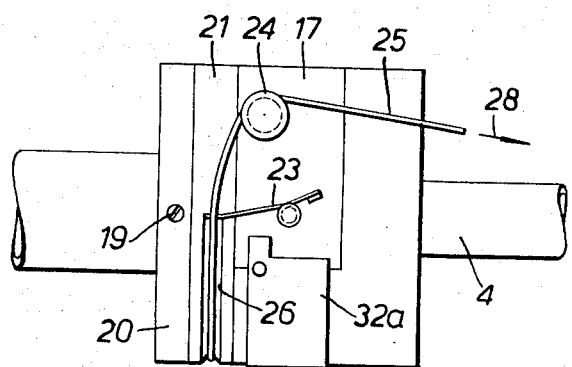
FIG. 3 is a part plan view along the arrow "B" of FIG. 1.
Figure 4:
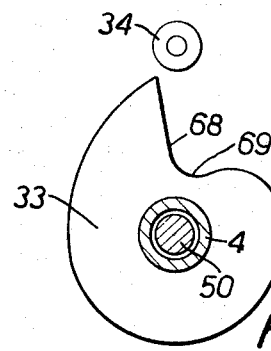
FIG. 4 is a scrap view along the line IV—IV of FIG. 1.

Between the ball bearings 6 and the wire wrapping and insulation stripping head 1 is a wireguide 14 which is secured to the outside of the driving member 4 by a grub screw 15, and a wire shearing mechanism 16. This wire shearing mechanism comprises a first part 17, which is secured to the body (not shown) of the tool, and which has a reduced diameter portion 18 at its forward end. Fixed to the reduced diameter portion by grub screws, one of which is shown at 19 (FIG. 3) is a ring 20. Between the ring 20 and the first part 17 is a second rotatable ring 21. This ring is biassed in a direction opposite to that of arrow 29 (FIG. 2) and abuts a stop 22, which projects from the first part 17. The ring is biassed by a spring 23 (FIG. 3) secured to the underside of the first part.

Also secured to the first part 17 is a capstan 24 around which is passed a cable 25. This cable passes behind the shearing mechanism 16, as seen in FIG. 1, lying in a groove 26 in the rotatable annular ring 21. The cable terminates in a nipple 27 which is larger than the entrance to the groove 26. When the cable is pulled in the direction of the arrow 28 (FIG. 3), the tension is transmitted around the capstan and the ring 21 is rotated in the direction of the arrow 29. The outer ring 20 has on its outer surface, a longitudinal groove 30 which co-operates with a cropping edge 31 on ring 21 to form the wire shearing dmchanism. The first part 17 has a groove 32 to accommodate the wire which is to be sheared, and a spring clip 32a to hold the wire in place, see below.

Connected to the driving member 4 is a snail cam 33 which co-operates with a cam follower 34 to form an indexing device. The cam follower 34 is mounted on the end of a lever 35 which is pivoted at 36 to the body of the tool. The lever 35 is in the form of a bell-crank, and having an arm 37 to which is connected a cable 38. The cam follower 34 is held against the cam 33 by a pair of springs, one of which is shown at 39. One end of the spring 39 is attached to the lever at 40, and the other end is secured to a pivot post 41 which is mounted on the tool body, and which also supports a nylon pulley 42.

The clutch assembly 9 includes a flywheel 43 secured to the driving member 4 by grub screws (not shown). The flywheel has a stepped bore having a narrow portion 44 and a broad portion 45. The rear portion 8, which is mounted in the body bearings 46 and 47, passes through the broad portion 45 and into the narrow portion 44 of the stepped bore. The rear portion 8 of the driving member is free to rotate within the narrow portion 44. Secured to the flywheel 43 by a bolt 48 is a spring 49. This spring is wound round the portion 8 and forms a clutch, the operation of which is described below.

Within the bores of the driving member 4, the portion 8 and the stem 2 is a stop member 50. This is simple rod which can be pushed in and out of the bores and clamped in any position by tightening down the locking ring 51 on to the split end of the rear portion 8. This stop member controls the extent to which a tag 52 can be pushed into the bore of the hollow stem 2 before coming into contact with the end of the stop member 50.

The switch 13 is a micro-switch operated by a trigger 53 which is pivoted at 54 to the tool body. The trigger has three functions. The wires 25 and 38 are connected to it, and are tensioned by screws 55 and 56 which engage the threaded bores 57 and 58 in the trigger. Movement of the trigger in the direction of the arrow 59 pulls the cables 25 and 38, operates the wire shearing device and lifts the cam follower 34 from the cam 33. The figures shown the position of the trigger after it has been moved sufficiently to operate the wire shearing device and to lift the cam follower 34 just clear of the cam 33. Further movement of the trigger brings it into engagement with a spring 60. This spring is mounted at 61 and carries a screw 62 engageable with an operating button 63. Continued movement of the trigger then deflects the spring 65 which operates the switch 13.

The wire wrapping and insulation stripping head 1 can take any suitable form. A suitable form of wire wrapping head is described in British Patent specification No. 1,096,311. Of course, the present invention is not limited to any particular form of wire wrapping head. The head in this case has a bore 64 (shown dotted) for accepting the tag 52 and a hole 65 (also shown dotted) through which wire to be wrapped is passed. The annulus 66 has a radial slot 67 opposite the hole 65, the slot being so dimensioned that it will permit the passage of the conductor of a wire to be wrapped, but will not permit passage of the insulation. The wire guide 14 has a slot which has a radial portion communicating with the surface and an inner tangential portion, the end of which is aligned with the longitudinal groove 30.

The tool is operated in the following manner:

The stop member 50 is adjusted so that the wrapped joint will be made in the required position on the tag 52. The wire which is to be wrapped on to the tag is passed through the hole 65 and the wire guide 14. The tool is then placed over the tag 52, and the wire is pulled tight, so as to make a neat joint when the wrap is completed. The wire is then pushed into the slot 67 to 'nick' the insulation, and the wire is laid in the groove 30 and passed under the spring clip 32a into the groove 32. The trigger 53 is then pulled. This rotates the ring 21 in the direction of the arrow 29 and crops the wire to length. The trigger also lifts the cam follower 34 clear of the cam 33. Subsequently, the switch 13 is switched on. The motor 12 then rotates the worm 11, which in turn rotates the wormwheel 10, and consequently the portion 8. As the portion 8 rotates, it 'picks-up' the spring 49 and tightens the spring down on to the portion 8, and this rotates the flywheel 43, and hence the driving member 4.

Rotation of the driving member 4 wraps the wire round the terminal tag 52, and consequently pulls the wire through the hole 65 and the slot 67, thus stripping the wire of its insulation. When all the wire has been wrapped, the trigger is released, switching off the motor and removing the tension from the cables 25 and 35.

Removing the tension from the cable 25 simply allows the wire shearing device to reset itself. However, releasing the tension in the cable 38 operates the indexing device. The motor, and hence the wrapping head, will stop in any position once the motor has been switched off. Thus the snail cam 33 will also stop in any position. However, when the cam follower 34 is pulled on to the cam by the springs, one of which is shown at 39, the cam is rotated until the follower abuts the face 68 and sits in the depression 69. For most stopping positions of the cam, the follower will bear on the helical surface of the cam, and the rotation of the members will then be such that the spring clutch 49 tends to disengage from the portion 8. However, if the cam is stopped so that the follower engages the end face 68, the follower will force the cam in the opposite position, and this will mean that the spring clutch will tend to 'pick-up' and lock, however, the reverse movement is small enough for the spring clutch to accommodate it without locking.

It will be appreciated that other forms of power tools could be made which would fall within the scope of the present invention. For example two triggers could be used with a single finger movement operating both of them. To ensure the sequential operation i.e. the actuation of the wire shearing mechanism before the energization of the motor, a convenient form of two-trigger construction employs one trigger mounted within, but projecting somewhat from, the other trigger. The projecting trigger actuates the wire shearing movement on operating pressure being applied to it whilst the continued application of pressure moves both triggers thereby energizing the motor. The interconnection between the trigger and the wire shearing mechanism could be electrical, the mechanism taking the form of a guillotine cropper actuated by an electro-magnet. The indexing mechanism could also be magnetically or electro-magnetically operated.

The motor used in the present invention is a D.C. motor supplied via a rectifier, which enables either A.C. or D.C. feed to be used. It will also be understood that an A.C. motor could be used and by suitable selection of the motor speed could be mounted directly in line with the portion 8. However, of course, an electric motor is not essential, for example a pneumatic motor would be acceptable especially for use in factories which have piped compressed air.

I claim:

1. A power-operated tool for making wrapped joints comprising in combination a drive member, a wire wrapping head rotatable by the drive member, a wire shearing mechanism, movable means for actuating the wire shearing mechanism, a motor connected to the drive member for rotating the latter, a control member for controlling operation of the motor, continued movement of the actuating means after actuation of the wire shearing mechanism operating the control member.

2. A tool as claimed in claim 1 in which the movable means comprises a trigger mechanically linked to the shearing mechanism.

3. A tool as claimed in claim 2 in which the motor is an electric motor and in which the control member is a switch operable by the trigger.

4. A tool as claimed in claim 1 in which the drive member includes first and second parts interconnected by a clutch enabling the first part to be drivably connected to the second part for rotating in a first direction and limited rotation of the second part relatively to the first part in the opposite direction.

5. A tool as claimed in claim 4 in which the clutch comprises a spiral spring in which the first part includes a tubular portion located within the spring.

6. A tool as claimed in claim 1 in which the wire shearing device includes two portions of annular form through which the drive member passes, one of the portions having a longitudinal groove on its external surface for receiving a wire to be sheared, and the other portion having a shearing edge which co-operates with the groove for shearing a length of wire.

7. A tool as claimed in claim 6 in which the one portion is fixed to the drive member and the other portion is rotatable by the movable actuating means.

8. A tool as claimed in claim 1 and further comprising indexing means for returning the wire wrapping head to a predetermined position after a wrapping operation.

9. A tool as claimed in claim 8 in which the indexing means comprises a snail cam having a snail surface operatively connected to the drive member, a cam follower resiliently-urged into contact with the snail surface of the cam and an arrangement for withdrawing the cam follower from contact with the snail surface.

10. A tool as claimed in claim 9 in which the arrangement comprises a mechanism coupling linking the cam follower with a tool operating trigger.

11. A tool as claimed in claim 1 and further comprising a head for removing, during a wrapping operation, insulation from a wire to be used to effect a wrapped connection.

12. A tool as claimed in claim 11 in which the insulation removing head is spaced from the wrapping head.

13. A tool as claimed in claim 12 in which the wrapping head is adjustable to vary the spacing between it and the wire shearing mechanism.

14. A tool as claimed in claim 1 in which the wire wrapping head is mounted upon a tube into which extends a member whose position is variable with respect to the tube in such manner as to control the effective length of the bore of the tube.

* * * * *